United States Patent
Zong et al.

(10) Patent No.: US 12,020,482 B2
(45) Date of Patent: Jun. 25, 2024

(54) LIVE STREAMING SAMPLING METHOD AND APPARATUS, AND ELECTRONIC DEVICE

(71) Applicant: BEIJING BYTEDANCE NETWORK TECHNOLOGY CO., LTD., Beijing (CN)

(72) Inventors: Xianzi Zong, Beijing (CN); Yi He, Beijing (CN); Yangyu Chen, Beijing (CN); Xinyu Wang, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 365 days.

(21) Appl. No.: 17/624,217

(22) PCT Filed: Oct. 29, 2020

(86) PCT No.: PCT/CN2020/124817
§ 371 (c)(1),
(2) Date: Dec. 30, 2021

(87) PCT Pub. No.: WO2021/143273
PCT Pub. Date: Jul. 22, 2021

(65) Prior Publication Data
US 2022/0383637 A1  Dec. 1, 2022

(30) Foreign Application Priority Data
Jan. 19, 2020 (CN) .......................... 202010060220.9

(51) Int. Cl.
*G06V 20/40* (2022.01)
*G06V 10/44* (2022.01)
(Continued)

(52) U.S. Cl.
CPC .............. *G06V 20/46* (2022.01); *G06V 10/44* (2022.01); *G06V 10/761* (2022.01); *G06V 10/7715* (2022.01)

(58) Field of Classification Search
CPC .. G06V 10/44; G06V 10/761; G06V 10/7715; G06V 20/46; G06V 20/48; H04N 21/44008
See application file for complete search history.

(56) References Cited

FOREIGN PATENT DOCUMENTS

| CN | 105025392 A | 11/2015 |
|----|-------------|---------|
| CN | 110505495 A | 11/2019 |
| CN | 111325096 A | 6/2020 |

OTHER PUBLICATIONS

International Patent Application No. PCT/CN2020/124817, International Search Report dated Jan. 27, 2021, 3 pages.
(Continued)

*Primary Examiner* — Manuchehr Rahmjoo (57) ABSTRACT

An embodiment of the disclosure provides a live steam sampling method and device and electronic equipment, which belong to the technical field of image processing. The method comprises: extracting multi-frame sampled images from live stream; screening out forward similar images from all sampled images, wherein the forward similar images are sampled images similar to a sampled image of a previous adjacent frame; and taking the rest of the sampled images, except from the forward similar images, in all sampled images as sampled images of the live stream. According to the solution of the disclosure, a solution of effectively eliminating the forward similar images in sampling operation based on a FPS is realized, thereby avoiding the leakage conditions, reducing total workload of sampling and checking, and improving efficiency of live stream sampling.

16 Claims, 3 Drawing Sheets

(51) Int. Cl.
*G06V 10/74* (2022.01)
*G06V 10/77* (2022.01)

(56) References Cited

OTHER PUBLICATIONS

Chinese Patent Application No. 202010060220.9, First Office Action dated Jan. 6, 2021, 9 pages.
Chinese Patent Application No. 202010060220.9, Notice of Allowance dated Mar. 4, 2021, 4 pages.
Chinese Patent Application No. 202010060220.9, Patent Certificate dated Apr. 20, 2021, 2 pages.

LIVE STREAMING SAMPLING METHOD AND APPARATUS, AND ELECTRONIC DEVICE

CROSS REFERENCE TO RELATED APPLICATIONS

The present application is the U.S. National Stage of International Application No. PCT/CN2020/124817, filed on Oct. 29, 2020, which application is based on a Chinese patent application with the application number of 202010060220.9 and the application date of Jan. 19, 2020 and titled "LIVE STREAMING SAMPLING METHOD AND APPARATUS, AND ELECTRONIC DEVICE", and claims the priority of the Chinese patent application, the disclosures of which are hereby incorporated by reference.

TECHNICAL FIELD

The disclosure relates to the technical field of image processing, and in particular to a live streaming sampling method and apparatus and electronic device.

BACKGROUND ART

During living broadcast, it is necessary to check whether video content violates regulations. In the checking process, a live stream which has the characteristics of large data volume and high efficiency requirements needs to be sampled. For conventional uniform sampling based on Frames Per Second (FPS for short), too large data volume that may cause pressure on checking will be caused if the FPS is too high, and many leakage conditions will occur if the FPS is too low.

Thus, the current live steam sampling solution has the technical problems of too large data volume or many leakage conditions.

SUMMARY OF THE INVENTION

In view of this, the embodiments of the present disclosure provide a live streaming sampling, which at least partially solves the problems existing in the prior art.

In the first aspect, the embodiments of the present disclosure provide a live stream sampling method, which is characterized by comprising:
  extracting multi-frame sampled images from live stream;
  screening out forward similar images from all sampled images, wherein the forward similar images are sampled images similar to a sampled image of a previous adjacent frame; and
  taking the rest of the sampled images, except from the forward similar images, in all sampled images as sampled images of the live stream.

According to a specific implementation of an embodiment of the present disclosure, the step of screening out the forward similar images from all sampled images comprises:
  computing a hash code of the sampled image of each frame;
  obtaining hash codes of the sampled image of each frame and the sampled image of the previous adjacent frame; and
  judging whether the sampled images are forward similar images in accordance with the hash codes of the sampled image of each frame and the sampled image of the previous adjacent frame.

According to a specific implementation of an embodiment of the present disclosure, the step of judging whether the sampled images are the forward similar images in accordance with the hash codes of the sampled image of each frame and the sampled image of the previous adjacent frame comprises:
  computing a Hamming distance between the hash code of the sampled image and the hash code of the sampled image of the previous adjacent frame;
  judging whether the Hamming distance is greater than or equal to a preset threshold value;
  judging the sampled image to be not the forward similar image if the Hamming distance is greater than or equal to a preset threshold value; and
  judging the sampled images to be the forward similar images if the Hamming distance is smaller than the preset threshold value.

According to a specific implementation of an embodiment of the present disclosure, the step of computing the hash code of the sampled image of each frame comprises:
  selecting a preset number of center points from the sampled image;
  determining neighborhood points of each center point;
  computing parameter difference values of a preset type between each center point and all neighborhood points thereof as a hash code section of the center point; and
  combining the hash code sections of all center points to obtain the hash code of the sampled image.

According to a specific implementation of an embodiment of the present disclosure, the step of computing the parameter difference values of the preset type between each center point and all neighborhood points thereof as the hash code section of the center point comprises:
  computing a pixel contrast value between the center point and each neighborhood point; and
  arranging the pixel contrast values between the center point and all neighborhood points in sequence according to a preset arrangement sequence to obtain a hash code section of the center point.

According to a specific implementation of an embodiment of the present disclosure, the step of computing the pixel contrast value between the center point and each neighborhood point comprises:
  acquiring a pixel value between the center point and the neighborhood point;
  recording the pixel contrast value between the center point and the neighborhood point as 1 if the pixel value of the center point is greater than the pixel value of the neighborhood point; and
  recording the pixel contrast value between the center point and the neighborhood point as 0 if the pixel value of the center point is smaller than or equal to the pixel value of the neighborhood point.

According to a specific implementation of an embodiment of the present disclosure, the step of determining the neighborhood points of each center point comprises:
  determining all pixel points adjacent to the center point on the sampled image.

According to a specific implementation of an embodiment of the present disclosure, the step of computing the hash code of the sampled image of each frame comprises:
  performing grey processing on the sampled image; and
  computing a hash code of the sampled image on which grey processing is performed.

According to a specific implementation of an embodiment of the present disclosure, the step of computing the hash code of the sampled image of each frame comprises:

performing scale transform on the sampled image to obtain a sampled image with a fixed size; and computing the hash code of the sampled image with the fixed size.

According to a specific implementation of an embodiment of the present disclosure, the step of computing the hash code of the sampled image with the fixed size comprises:

performing scale transform on the sampled image with the fixed size to obtain sampled images of at least two preset scales; and obtaining a hash code section of the sampled image with each preset scale; and arranging hash code sections of all the sampled images of preset scales in sequence in accordance with a preset arrangement sequence to obtain the hash code of the sampled image.

In the second aspect, the embodiments of the present disclosure provide a live stream sampling device, which is characterized by comprising:

an extracting module configured to extract multi-frame sampled images from live stream;

a screening module configured to screen out forward similar images from all the sampled images, wherein the forward similar images are sampled images similar to a sampled image of a previous adjacent frame; and a processing module configured to take the rest of the sampled images, except from the forward similar images, in all sampled images as sampled images of the live stream.

In the third aspect, the embodiments of the present disclosure also provide an electronic equipment, which is characterized by comprising:

at least one processor; and at least one memory which is in communication connection with the at least one processor, wherein the memory stores an instruction which can be executed by the at least one processor, and the instruction is executed by the at least one processor, so that the at least one processor can execute the live stream sampling method of the first aspect or any implementation of the first aspect.

In the fourth aspect, the embodiments of the present disclosure also provide a non-transit computer readable storage medium which stores a computer instruction, which is characterized in that the computer instruction is configured to make a computer execute the live stream sampling method of the first aspect or any implementation of the first aspect.

In a fifth aspect, the embodiments of the present disclosure also provide a computer program product. The computer program product includes a computing program stored on a non-transitory computer-readable storage medium. The computer program includes program instructions. When executing, the computer is caused to execute the live stream sampling method in the foregoing first aspect or any implementation manner of the first aspect.

A live steam sampling solution in an embodiment of the disclosure includes: extracting multi-frame sampled images from live stream; screening out forward similar images from all sampled images, wherein the forward similar images are sampled images similar to a sampled image of a previous adjacent frame; and taking the rest of the sampled images, except from the forward similar images, in all sampled images as sampled images of the live stream. According to the solution of the disclosure, a solution of effectively eliminating the forward similar images in sampling operation that adopts a high FPS is realized, thereby avoiding the leakage conditions, reducing total workload of sampling and checking, and improving the efficiency of live stream sampling.

BRIEF DESCRIPTION OF THE DRAWINGS

In order to explain the technical solutions of the embodiments of the present disclosure more clearly, the following will briefly introduce the drawings needed in the embodiments. Obviously, the drawings in the following description are only some embodiments of the present disclosure. For those of ordinary skill in the art, without creative work, other drawings can be obtained from these drawings.

DETAILED DESCRIPTION OF THE INVENTION

The embodiments of the present disclosure will be described in detail below with reference to the accompanying drawings.

The following describes the implementation of the present disclosure through specific examples, and those skilled in the art can easily understand other advantages and effects of the present disclosure from the content disclosed in this specification. Obviously, the described embodiments are only a part of the embodiments of the present disclosure, rather than all the embodiments. The present disclosure can also be implemented or applied through other different specific embodiments, and various details in this specification can also be modified or changed based on different viewpoints and applications without departing from the spirit of the present disclosure. It should be noted that, in the case of no conflict, the following embodiments and the features in the embodiments can be combined with each other. Based on the embodiments in the present disclosure, all other embodiments obtained by those of ordinary skill in the art without creative work shall fall within the protection scope of the present disclosure.

It should be noted that various aspects of the embodiments within the scope of the appended claims are described below. It should be obvious that the aspects described herein can be embodied in a wide variety of forms, and any specific structure and/or function described herein are only illustrative. Based on the present disclosure, those skilled in the art should understand that one aspect described herein can be implemented independently of any other aspects, and two or more of these aspects can be combined in various ways. For example, any number of aspects set forth herein can be used to implement devices and/or methods of practice. In addition, structures and/or functionalities other than one or more of the aspects set forth herein may be used to implement this device and/or practice this method.

It should also be noted that the illustrations provided in the following embodiments only illustrate the basic idea of the present disclosure in a schematic manner. The figures only show the components related to the present disclosure rather than the number, shape, and shape of the components in actual implementation. For size drawing, the type, quantity, and proportion of each component can be changed at will during actual implementation, and the component layout type may also be more complicated.

In addition, in the following description, specific details are provided to facilitate a thorough understanding of the examples. However, those skilled in the art will understand that the aspects can be practiced without these specific details.

An embodiment of the disclosure provides a live stream sampling method. The live stream sampling method provided in the embodiment can be executed by a computing device which can be software or combination of software and hardware, and can be integrated in a server, terminal device and the like.

Figure 1:
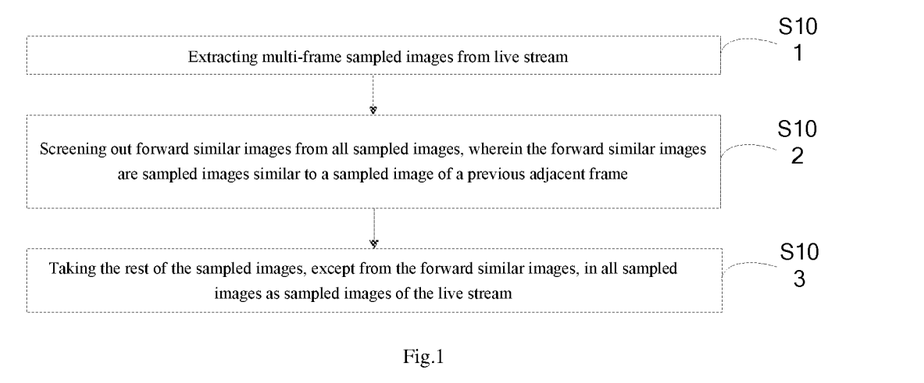
FIG. 1 is a flow chart showing a live stream sampling method provided by an embodiment of the disclosure.

By referring to FIG. 1, an embodiment of the disclosure provides a live stream sampling method, including:

S101, multi-frame sampled images are extracted from live stream.

The live stream sampling method provided in the embodiment is used to extract frames of images and check video content in living broadcast so as to check whether the detected video content vibrates regulations. Due to very large data volume of the live stream, a fixed FPS can be adopted for uniform sampling and extract the multi-frame sampled images from live stream so as to guarantee higher sampling efficiency. The data volume of the extracted sampled images is relatively large in case of a relatively high FPS.

S102, forward similar images are screened out from all sampled images, wherein the forward similar images are sampled images similar to a sampled image of a previous adjacent frame.

In the step, the multi-frame sampled images are uniformly sampled based on the FPS. Considering that the content of several adjacent frames of images is possibly similar, great workload of checking is possibly cussed and repeated checking occurs if all sampled images are checked. The extracted multi-frame sampled images can be firstly screened by electronic equipment to find which sampled images are similar to other images. The sampled images similar to the image of the previous adjacent frame are defined as forward similar images which are screened out from all sampled images through the electronic equipment. It should be noted that the similarity here can mean that the content is completely the same, or the content is relatively close but not completely the same. The forward adjacent frame may also be an image with similar content in all preceding adjacent frames or the similar images may be reduced by screening backward similar images, which is not limited.

S103, the rest of the sampled images, except from the forward similar images, in all sampled images are taken as sampled images of the live stream.

After the forward similar images similar to the image of the previous adjacent frame are screened out from all sampled images in accordance with the steps, the screened-out forward similar image can be eliminated from all sampled images; and the rest of the sampled images are taken as sampled images of the live stream to check content of the live stream according to the rest of the sampled images.

Figure 2:
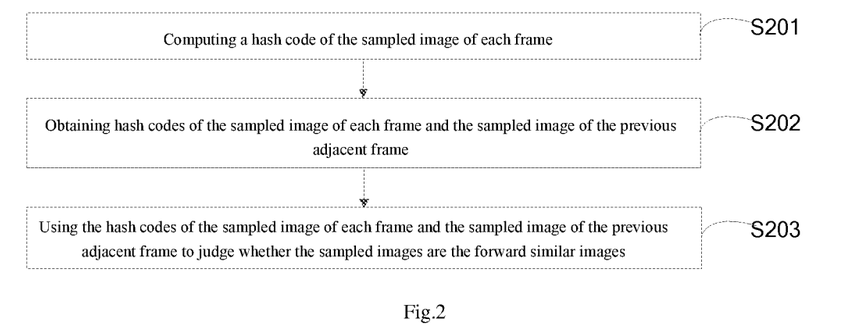
FIG. 2 is a partial flow chart showing another live stream sampling method provided by an embodiment of the disclosure.

In a specific embodiment, as shown in FIG. 2, the step S102 of screening out the forward similar images from all sampled images may include:

S201, a hash code of the sampled image of each frame is computed.

In the embodiment, similarity between images is judged in accordance with the hash code of the sampled image of each frame. Computing the hash code of the image refers to using a hash algorithm to allow each sampled image in the same group of images to have a different hash code according to different characteristics thereof, which does not mean that the hash codes of different objects are completely different.

S202, hash codes of the sampled image of each frame and the sampled image of the previous adjacent frame are obtained.

S203, the hash codes of the sampled image of each frame and the sampled image of the previous adjacent frame are used to judge whether the sampled images are the forward similar images.

After the hash code of the image of each frame in all sampled images is computed, hash code comparison is implemented between the sampled image of each frame from the sampled image of the second frame and the sampled image of the previous adjacent frame to judge similarity between the two images so as to judge whether the sampled image of the current frame is the forward similar image.

In specific implementation, the step S203 of using the hash codes of the sampled image of each frame and the sampled image of the previous adjacent frame to judge whether the sampled images are the forward similar images may include:

A Hamming distance between the hash code of the sampled image and the hash code of sampled image of the previous adjacent frame is computed.

Whether the Hamming distance is greater than or equal to a preset threshold value is judged.

The sampled image is judged to be not the forward similar image if the Hamming distance is greater than or equal to a preset threshold value.

The sampled image is judged to be the forward similar image if the Hamming distance is smaller than the preset threshold value.

In the embodiment, when hash code comparison among the sampled images is implemented, the Hamming distance between the hash codes of the two images is computed to judge whether the sampled image of the current frame is the forward similar image in sequence. The Hamming distance refers to number of different characters on corresponding positions between two equal-length character strings, that is, one character string is transformed into characters to be replaced in another character string. Similarity among the sampled images can be computed by computing the Hamming distance between the hash codes of two sampled images. The difference between the hash codes of the two is great, and the sampled image of the current frame is not the forward similar image if the Hamming distance is greater than or equal to the preset threshold value. The difference between the hash codes of the two is small, and the sampled image of the current frame is the forward similar image if the Hamming distance is smaller than the preset threshold value. It should be noted that the set preset threshold value is highly correlated with filter needs, number of the sampled images, or the number of selected points, and there is no specific numerical limitation.

Figure 3:
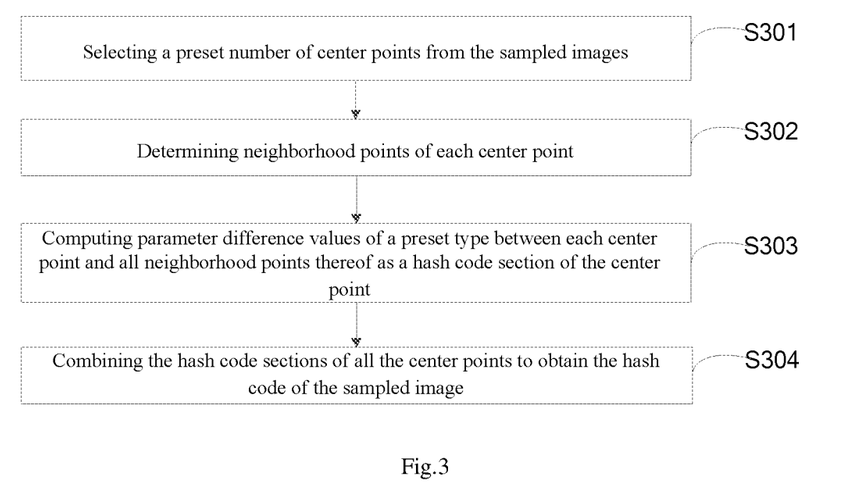
FIG. 3 is a partial flow chart showing another live steam sampling method provided by an embodiment of the disclosure.

In the embodiment, as shown in FIG. 3, the step S201 of screening out the hash code of the sampled frame of each frame may include:

S301, a preset number of center points are selected from the sampled images.

When the hash code of the sampled frame of each frame is specifically computed, a preset number of center points are firstly selected from the sampled images as reference points for computing the hash codes of the sampled images.

S302, neighborhood points of each center point are determined.

In the embodiment, computing the hash code is based on difference of display parameters between the reference points and surrounding pixel points; and the neighborhood points of each center point are redetermined after the center point is selected on each sampled image.

Optionally, the step of determining the neighborhood points of each center point may include:

All pixel points adjacent to the center point on the sampled image are determined.

Figure 4:
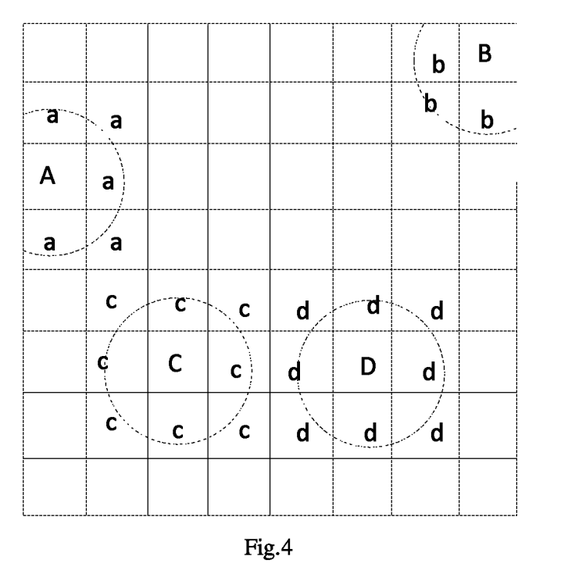
FIG. 4 is a schematic diagram of selecting neighborhood points in a live stream sampling method provided by an embodiment of the disclosure.

If the center point is located on an edge row of the sampled image, the neighborhood points thereof are adjacent pixel points in a process of extending towards the inner side of the sampled image from the center point, generally the center point on the edge row has 5 neighborhood points (A and a as shown in FIG. 4) or 3 neighborhood points (B and b as shown in FIG. 4). If the center point is located on a non-edge row of the sampled image, the neighborhood points thereof are adjacent pixel points in a process of extending to the periphery from the center point, generally the center point on the non-edge row has 8 neighborhood points (C and c as shown in FIG. 4), and the like.

S303, parameter difference values of a preset type between each center point and all neighborhood points thereof are computed as a hash code section of the center point.

A plurality of center points are selected on the sampled image, and the hash code section corresponding to each center point is firstly computed, wherein parameter difference values between each center point and all neighbor points thereof are mainly computed.

Optionally, the step of computing the parameter difference values of the preset type between each center point and all neighborhood points thereof as the hash code section of the center point may include:

A pixel contrast value between the center point and each neighborhood point is computed.

The hash code section of the center point is obtained by arranging the pixel contrast values between the center point and all neighborhood points in sequence according to a preset arrangement sequence.

Further, the step of computing the pixel contrast value between the center point and each neighborhood point includes:

A pixel value between the center point and the neighborhood point is acquired.

The pixel contrast value between the center point and the neighborhood point is recorded as 1 if the pixel value of the center point is greater than the pixel value of the neighborhood point.

The pixel contrast value between the center point and the neighborhood point is recorded as 0 if the pixel value of the center point is smaller than or equal to the pixel value of the neighborhood point.

S304, the hash code sections of all center points are combined to obtain the hash code of the sampled image.

The hash code section corresponding to each center point is obtained through the step and then may be combined to obtain the hash code corresponding to the sampled image.

To guarantee the contrast effect, selection parameters of the center point, the arrangement sequence of pixel contrast values between the center point and the neighborhood points and the arrangement sequence of the hash code sections corresponding to all center points are predetermined during computing of the hash codes. In this way, the contrast effect is more accurate in case of consistent operation.

In addition, according to another specific implementation of the embodiment of the disclosure, the step of computing the hash code of the sampled image of each frame includes:

Grey processing is performed on the sampled image.

The hash code of the sampled image on which grey processing is performed is computed.

Grey processing and computing of the hash code are sequentially performed on the sampled image, so that excessive amount of computation due to RGB parameters is reduced, and a hash code computing process is simplified.

In addition, the step of computing the hash code of the sampled image of each frame may include:

Scale transform is performed on the sampled image to obtain a sampled image with a fixed size.

The hash code of the sampled image with the fixed size is computed.

Further, the step of computing the hash code of the sampled image with the fixed size includes:

Scale transform is performed on the sampled image with the fixed size to obtain a sampled image with at least two preset scales.

A hash code section of the sampled image with each preset scale is obtained.

A hash code of the sampled image is obtained by arranging hash code sections of all preset scales in sequence in accordance with a preset arrangement sequence.

The initial scale of each sampled image is transformed to a fixed size, and scale transform of the same type is added on the basis of the fixed size. In this way, the obtained hash code value is richer and more accurate, and hash code contrast reference is higher.

In specific use, a computing method of computing a hash code of a given sampled image includes:

Firstly, a given RGB image is transformed into a greyscale image and then grey transform is performed on a given original image until the original image is resized to the fixed size, and multiple scales of A1, A2, A3 and the like can be selected. The more the scales, the more precise the computed hash code.

Generally N*N, for example 4, 9, 16 proper center points Center_Point are respectively selected for images with different scales obtained in the last step, and at the same time, proper number of neighbor points Neighbour_Points with proper sizes are selected.

If the pixel value of the center point Center_Point is greater than the pixel values of the neighbor points Neighbour_Points, the pixel value contrast value between the center point and the neighbor points is recorded as 1; and if the pixel value of the center point Center_Point is less than or equal to the pixel values of the neighbor points Neighbour_Points, the pixel contrast value between the center point and the neighbor points is recorded as 0.

This process is repeated for different scales of A1, A2, A3 and the like, the given image can be represented by a string of hash codes, and a vector value representing the image can be obtained, for example v=[0001000].

Similarity of the images is judged by computing a distance among different hash codes.

As shown in FIG. 4, the original image is resized to 8*8, and four center points Center_Point (2, 2), (2, 5), (5,2) and (5, 5) are selected. 8 neighbor points Neighbour_Points with distances of 1 pix around each center point Center_Point are respectively selected to finally compute hash codes to finally obtain the hash codes of 4*8=32.

A live steam sampling solution in an embodiment of the disclosure provides includes: multi-frame sampled images are extracted from live stream; forward similar images are screened out from all sampled images, wherein the forward similar images are sampled images similar to a sampled image of a previous adjacent frame; and the rest of sampled images, except from the forward similar images, in all the sampled images are taken as sampled images of live stream. According to the solution of the disclosure, a solution of effectively eliminating the forward similar images in sampling operation which adopts a FPS is realized, thereby avoiding the leakage conditions, reducing total workload of sampling and checking, and improving efficiency of live stream sampling.

Figure 5:
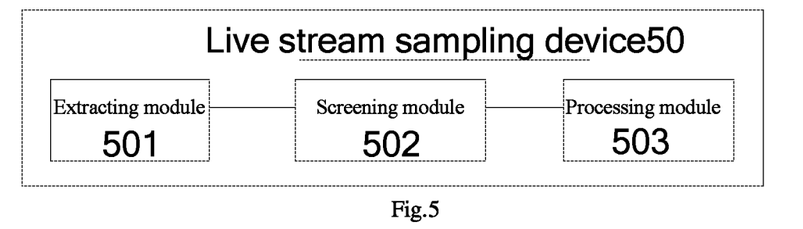
FIG. 5 is a structural schematic diagram showing a live steam sampling device provided by an embodiment of the disclosure.

Corresponding to embodiments of the method mentioned above, as shown in FIG. 5, an embodiment that the disclosure further provides a live stream sampling device 50, including:

an extracting module 501, configured to extract multi-frame sampled images from live stream;

a screening module 502, configured to screen out forward similar images from all sampled images, wherein the forward similar images are sampled images similar to a sampled image of a previous adjacent frame; and a processing module 503, configured to take the rest of the sampled images, except from the forward similar images, in all sampled images as sampled images of the live stream.

The device as shown in FIG. 5 can correspondingly perform the content in the embodiments of the method; and for parts not described in detail in the embodiment, the content recorded in the embodiments of the method mentioned above can be seen as reference, which are not further described.

Figure 6:
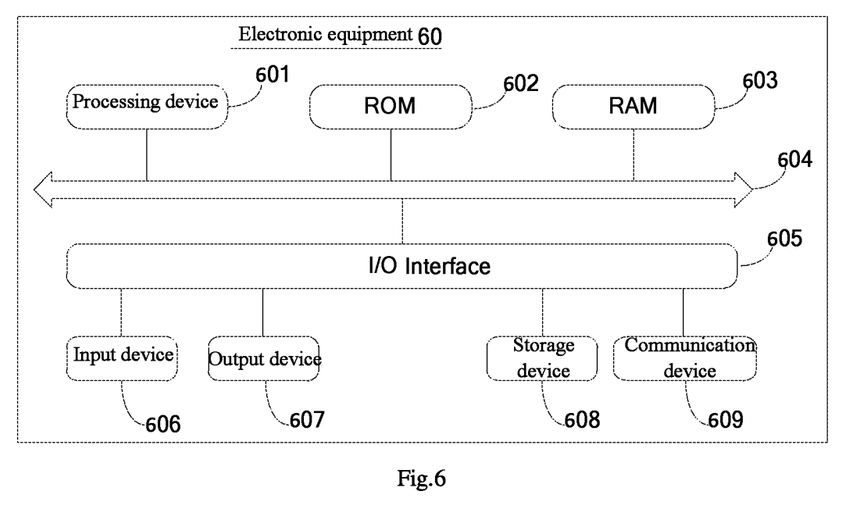
FIG. 6 is a schematic diagram showing electronic equipment provided by an embodiment of the disclosure.

By referring to FIG. 6, an embodiment of the disclosure further provides electronic equipment 60, including:

at least one processor, and a memory which is in communication connection with the at least one memory, wherein The memory stores an instruction which can be executed by the at least one processor, and the instruction is executed by the at least one processor, so that the at least one processor can execute the live stream sampling method in the embodiment of the method mentioned above.

An embodiment of the disclosure further provides a non-transit computer readable storage medium which stores a computer instruction. The computer instruction is configured to make a computer execute the live stream sampling method in the embodiments of the method mentioned above.

An embodiment of the disclosure further provides a computer program product which includes computing program stored on the non-transit computer readable storage medium. The computer program includes a program instruction which makes the computer execute the live stream sampling method in the embodiments of the method mentioned above while executed by the computer.

Reference is now made to FIG. 6, which shows a schematic structural diagram of an electronic equipment 60 suitable for implementing embodiments of the present disclosure. The electronic equipment in the embodiments of the present disclosure may include, but are not limited to, mobile phones, notebook computers, digital broadcast receivers, PDAs (personal digital assistants), PADs (tablets), PMPs (portable multimedia players), vehicle-mounted terminals (for example, Car navigation terminals) and other mobile terminals and fixed terminals such as digital TVs, desktop computers, etc. The electronic equipment shown in FIG. 6 is only an example, and should not bring any limitation to the function and scope of use of the embodiments of the present disclosure.

As shown in FIG. 6, the electronic equipment 60 may include a processing device (such as a central processing unit, a graphics processor, etc.) 601, which may be loaded into a random access device according to a program stored in a read-only memory (ROM) 602 or from a storage device 608. The program in the memory (RAM) 603 executes various appropriate actions and processing. In the RAM 603, various programs and data required for the operation of the electronic equipment 60 are also stored. The processing device 601, the ROM 602, and the RAM 603 are connected to each other through a bus 604. An input/output (I/O) interface 605 is also connected to the bus 604.

Generally, the following devices can be connected to the I/O interface 605: including input devices 606 such as touch screens, touch panels, keyboards, mice, image sensors, microphones, accelerometers, gyroscopes, etc.; including, for example, liquid crystal displays (LCD), speakers, An output device 607 such as a vibrator; a storage device 608 including, for example, a magnetic tape, a hard disk, etc.; and a communication device 609. The communication device 609 may allow the electronic equipment 60 to perform wireless or wired communication with other devices to exchange data. Although the figure shows the electronic equipment 60 with various devices, it should be understood that it is not required to implement or have all the devices shown. It may be implemented alternatively or provided with more or fewer devices.

In particular, according to an embodiment of the present disclosure, the process described above with reference to the flowchart can be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded and installed from the network through the communication device 609, or installed from the storage device 608, or installed from the ROM 602. When the computer program is executed by the processing device 601, the above-mentioned functions defined in the method of the embodiment of the present disclosure are executed.

It should be noted that the aforementioned computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, device, or device, or any combination of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination of the above.

The above-mentioned computer-readable medium may be included in the above-mentioned electronic equipment; or it may exist alone without being assembled into the electronic equipment.

The foregoing computer-readable medium carries one or more programs, and when the foregoing one or more programs are executed by the electronic equipment, the electronic equipment can implement the solutions provided by the foregoing method embodiments.

Alternatively, the aforementioned computer-readable medium carries one or more programs, and when the aforementioned one or more programs are executed by the electronic equipment, the electronic equipment can implement the solutions provided by the aforementioned method embodiments.

The computer program code used to perform the operations of the present disclosure may be written in one or more programming languages or a combination thereof. The above-mentioned programming languages include object-oriented programming languages—such as Java, Smalltalk, C++, and also conventional Procedural programming language-such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass Internet connection).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of code contains one or more for realizing the specified logic function. Executable instructions. It should also be noted that in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations or it can be realized by a combination of dedicated hardware and computer instructions.

The units involved in the embodiments described in the present disclosure can be implemented in software or hardware. Wherein, the name of the unit does not constitute a limitation on the unit itself under certain circumstances. For example, the first obtaining unit can also be described as "a unit for obtaining at least two Internet Protocol addresses."

It should be understood that each part of the present disclosure can be implemented by hardware, software, firmware, or a combination thereof.

The above are only specific embodiments of the present disclosure, but the protection scope of the present disclosure is not limited thereto. Any person skilled in the art can easily think of changes or substitutions within the technical scope disclosed in the present disclosure. All should be covered within the protection scope of this disclosure. Therefore, the protection scope of the present disclosure should be subject to the protection scope of the claims.

The invention claimed is:

1. A live stream sampling method, which is characterized by comprising:
   extracting multi-frame sampled images from live stream;
   screening out forward similar images from all sampled images, wherein the forward similar images are sampled images similar to a sampled image of a previous adjacent frame; and
   taking the rest of the sampled images, except from the forward similar images, in all sampled images as sampled images of the live stream,
   wherein the step of screening out the forward similar images from all sampled images comprises:
   computing a hash code of the sampled image of each frame;
   obtaining hash codes of the sampled image of each frame and the sampled image of the previous adjacent frame; and
   judging whether the sampled images are forward similar images in accordance with the hash codes of the sampled image of each frame and the sampled image of the previous adjacent frame, and
   wherein the step of computing the hash code of the sampled image of each frame comprises:
   performing grey processing on the sampled image; and
   computing a hash code of the sampled image on which grey processing is performed.

2. The method of claim 1, which is characterized in that the step of judging whether the sampled images are the forward similar images in accordance with the hash codes of the sampled image of each frame and the sampled image of the previous adjacent frame comprises:
   computing a Hamming distance between the hash code of the sampled image and the hash code of the sampled image of the previous adjacent frame;
   judging whether the Hamming distance is greater than or equal to a preset threshold value;

judging the sampled image to be not the forward similar image if the Hamming distance is greater than or equal to a preset threshold value; and judging the sampled images to be the forward similar images if the Hamming distance is smaller than the preset threshold value.

3. The method of claim 2, which is characterized in that the step of computing the hash code of the sampled image of each frame comprises:

selecting a preset number of center points from the sampled image;

determining neighborhood points of each center point;

computing parameter difference values of a preset type between each center point and all neighborhood points thereof as a hash code section of the center point; and combining the hash code sections of all center points to obtain the hash code of the sampled image.

4. The method of claim 3, which is characterized in that the step of computing the parameter difference values of the preset type between each center point and all neighborhood points thereof as the hash code section of the center point comprises:

computing a pixel contrast value between the center point and each neighborhood point; and arranging the pixel contrast values between the center point and all neighborhood points in sequence according to a preset arrangement sequence to obtain a hash code section of the center point.

5. The method of claim 4, which is characterized in that the step of computing the pixel contrast value between the center point and each neighborhood point comprises:

acquiring a pixel value between the center point and the neighborhood point;

recording the pixel contrast value between the center point and the neighborhood point as 1 if the pixel value of the center point is greater than the pixel value of the neighborhood point; and recording the pixel contrast value between the center point and the neighborhood point as 0 if the pixel value of the center point is smaller than or equal to the pixel value of the neighborhood point.

6. The method of claim 3, which is characterized in that the step of determining the neighborhood points of each center point comprises:

determining all pixel points adjacent to the center point on the sampled image.

7. The method of claim 1, which is characterized in that the step of computing the hash code of the sampled image of each frame comprises:

performing scale transform on the sampled image to obtain a sampled image with a fixed size; and computing the hash code of the sampled image with the fixed size.

8. The method of claim 7, which is characterized in that the step of computing the hash code of the sampled image with the fixed size comprises:

performing scale transform on the sampled image with the fixed size to obtain sampled images of at least two preset scales; and obtaining a hash code section of the sampled image with each preset scale; and arranging hash code sections of all the sampled images of preset scales in sequence in accordance with a preset arrangement sequence to obtain the hash code of the sampled image.

9. Electronic equipment, which is characterized by comprising:

at least one processor; and at least one memory which is in communication connection with the at least one processor, wherein the memory stores an instruction which can be executed by the at least one processor, and the instruction is executed by the at least one processor, so that the at least one processor can execute a live stream sampling method comprising:

extracting multi-frame sampled images from live stream;

screening out forward similar images from all sampled images, wherein the forward similar images are sampled images similar to a sampled image of a previous adjacent frame; and taking the rest of the sampled images, except from the forward similar images, in all sampled images as sampled images of the live stream, wherein the step of screening out the forward similar images from all sampled images comprises:

computing a hash code of the sampled image of each frame;

obtaining hash codes of the sampled image of each frame and the sampled image of the previous adjacent frame; and judging whether the sampled images are forward similar images in accordance with the hash codes of the sampled image of each frame and the sampled image of the previous adjacent frame, and wherein the step of computing the hash code of the sampled image of each frame comprises:

performing grey processing on the sampled image; and computing a hash code of the sampled image on which grey processing is performed.

10. The electronic equipment of claim 9, which is characterized in that the step of judging whether the sampled images are the forward similar images in accordance with the hash codes of the sampled image of each frame and the sampled image of the previous adjacent frame comprises:

computing a Hamming distance between the hash code of the sampled image and the hash code of the sampled image of the previous adjacent frame;

judging whether the Hamming distance is greater than or equal to a preset threshold value;

judging the sampled image to be not the forward similar image if the Hamming distance is greater than or equal to a preset threshold value; and judging the sampled images to be the forward similar images if the Hamming distance is smaller than the preset threshold value.

11. The electronic equipment of claim 10, which is characterized in that the step of computing the hash code of the sampled image of each frame comprises:

selecting a preset number of center points from the sampled image;

determining neighborhood points of each center point;

computing parameter difference values of a preset type between each center point and all neighborhood points thereof as a hash code section of the center point; and combining the hash code sections of all center points to obtain the hash code of the sampled image.

12. The electronic equipment of claim 11, which is characterized in that the step of computing the parameter difference values of the preset type between each center point and all neighborhood points thereof as the hash code section of the center point comprises:

computing a pixel contrast value between the center point and each neighborhood point; and arranging the pixel contrast values between the center point and all neighborhood points in sequence according to a preset arrangement sequence to obtain a hash code section of the center point.

13. The electronic equipment of claim 12, which is characterized in that the step of computing the pixel contrast value between the center point and each neighborhood point comprises:
   acquiring a pixel value between the center point and the neighborhood point;
   recording the pixel contrast value between the center point and the neighborhood point as 1 if the pixel value of the center point is greater than the pixel value of the neighborhood point; and
   recording the pixel contrast value between the center point and the neighborhood point as 0 if the pixel value of the center point is smaller than or equal to the pixel value of the neighborhood point.

14. The electronic equipment of claim 11, which is characterized in that the step of determining the neighborhood points of each center point comprises:
   determining all pixel points adjacent to the center point on the sampled image.

15. The electronic equipment of claim 9, which is characterized in that the step of computing the hash code of the sampled image of each frame comprises:
   performing scale transform on the sampled image to obtain a sampled image with a fixed size; and
   computing the hash code of the sampled image with the fixed size.

16. A non-transit computer readable storage medium which stores a computer instruction, which is characterized in that the computer instruction is configured to make a computer execute a live stream sampling method comprising:
   extracting multi-frame sampled images from live stream;
   screening out forward similar images from all sampled images, wherein the forward similar images are sampled images similar to a sampled image of a previous adjacent frame; and
   taking the rest of the sampled images, except from the forward similar images, in all sampled images as sampled images of the live stream,
   wherein the step of screening out the forward similar images from all sampled images comprises:
   computing a hash code of the sampled image of each frame;
   obtaining hash codes of the sampled image of each frame and the sampled image of the previous adjacent frame; and
   judging whether the sampled images are forward similar images in accordance with the hash codes of the sampled image of each frame and the sampled image of the previous adjacent frame, and
   wherein the step of computing the hash code of the sampled image of each frame comprises:
   performing grey processing on the sampled image; and
   computing a hash code of the sampled image on which grey processing is performed.

\* \* \* \* \*